(12) United States Patent
Kitano et al.

(10) Patent No.: US 7,105,600 B2
(45) Date of Patent: Sep. 12, 2006

(54) POLYMER COMPOSITION

(75) Inventors: Hajime Kitano, Ibaraki (JP); Koichi Wada, Ibaraki (JP); Masanari Uno, Ibaraki (JP)

(73) Assignee: Kuraray Co., Ltd., Kurashiki (JP)

( * ) Notice: Subject to any disclaimer, the term of this patent is extended or adjusted under 35 U.S.C. 154(b) by 432 days.

(21) Appl. No.: 10/344,580

(22) PCT Filed: Aug. 7, 2001

(86) PCT No.: PCT/JP01/06781

§ 371 (c)(1),
(2), (4) Date: Feb. 13, 2003

(87) PCT Pub. No.: WO02/14423

PCT Pub. Date: Feb. 21, 2002

(65) Prior Publication Data

US 2004/0092666 A1    May 13, 2004

(30) Foreign Application Priority Data

Aug. 14, 2000  (JP) ............................. 2000-245642
Mar. 15, 2001  (JP) ............................. 2001-73897

(51) Int. Cl.
*C08C 19/04*   (2006.01)
*C08F 8/06*    (2006.01)

(52) U.S. Cl. ..................... 525/98; 525/192; 525/194; 525/387

(58) Field of Classification Search .................. 525/98, 525/192, 194, 387
See application file for complete search history.

(56) References Cited

U.S. PATENT DOCUMENTS

| 5,702,827 | A  |   | 12/1997 | Itoh et al. |
| 5,936,037 | A  | * | 8/1999  | Tasaka ............. 525/92 B |
| 6,087,431 | A  |   | 7/2000  | Uchida et al. |
| 6,184,290 | B1 |   | 2/2001  | Ahmed et al. |
| 6,433,062 | B1 | * | 8/2002  | Tasaka et al. ............ 524/484 |

FOREIGN PATENT DOCUMENTS

| EP | 712892 | 5/1996 |
| EP | 0 645 498 A1 | 6/1998 |
| JP | 2001-26663 | 1/1930 |
| JP | 9-137011 | 5/1997 |
| JP | 9-316287 | 12/1997 |
| JP | 10-53688 | 2/1998 |
| JP | 10-130452 | 5/1998 |
| JP | 10-251480 | 9/1998 |
| JP | 10-279738 | 10/1998 |
| JP | 11-21415 | 1/1999 |
| JP | 2000-17141 | 1/2000 |
| JP | 2000-139503 | 5/2000 |
| JP | 2000-186197 | 7/2000 |
| JP | 2000-290331 | 10/2000 |
| JP | 2001-197902 | 7/2001 |
| WO | 95/33006 | 12/1995 |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

A polymer composition obtainable by subjecting a particular crosslinkable polymer composition to dynamic crosslinking. The crosslinkable polymer composition contains. (a) a block copolymer comprising two or more polymer blocks of a vinyl aromatic compound and one or more (hydrogenated) polymer blocks of a conjugated diene; (b) an olefin copolymer having a density of 0.88 to 0.92 $g/cm^2$ and obtained through copolymerization of ethylene and an α-olefin having 4 to 12 carbon atoms; (c) a softening agent; and (d) an organic peroxide in respective amounts that satisfy the following relational expressions ① to ③:

$$0.66 \leq Wb/Wa \leq 4 \quad ①$$

$$0 \leq Wc/(Wa+Wb+Wc) \leq 0.25 \quad ②$$

$$0.001 \leq Wd/(Wa+Wb+Wc) \leq 0.01 \quad ③$$

wherein Wa, Wb, Wc and Wd represent the respective amounts (by mass) of the components (a), (b), (c) and (d), that are present in the polymer composition prior to the dynamic crosslinking.

The polymer composition of the present invention is based on a thermoplastic elastomer that has various improved properties, including moldability, abrasion resistance, scratch resistance, hydrolysis resistance, softness, rubber elasticity, grip, shock absorbance, oil resistance, light-weightness and mechanical strength, and has these properties in a well-balanced manner.

18 Claims, No Drawings

POLYMER COMPOSITION

TECHNICAL FIELD

The present invention pertains to a polymer composition comprising a thermoplastic elastomer, as well as to footgear soles using such a polymer composition. The polymer composition of the present invention has various improved properties, including moldability, abrasion resistance, scratch resistance, hydrolysis resistance, softness, rubber elasticity, grip, shock absorbance, oil resistance, lightweightness and mechanical strength, and thus can be effectively used in various applications. Among other properties, the improved abrasion resistance, scratch resistance, hydrolysis resistance, grip, shock absorbance and oil resistance make the composition of the present invention particularly suitable for use in shoe soles and other footgear soles.

BACKGROUND ART

Thermoplastic elastomers are known to exhibit rubber elasticity at room temperature and can readily be plasticized, melted, and thus molded upon heating. Also, thermoplastic elastomers can be recycled. For these reasons, thermoplastic elastomers have recently become widely used in various fields, including automobile parts, home electric appliances, toys, sports equipment, and articles of daily use.

Among other thermoplastic elastomers, styrene thermoplastic elastomers, such as styrene-butadiene-styrene (SBS) block copolymers, styrene-isoprene-styrene (SIS) block copolymers and hydrogenated products thereof, are particularly widely used since these elastomers are less expensive and have a better flexibility. Also widely used are thermoplastic polyurethane elastomers (TPU), which have a high abrasion resistance and a better mechanical strength.

Many proposals have been made thus far to improve physical properties of the styrene thermoplastic elastomers. For example, an improved thermoplastic elastomer composition is known that contains a styrene thermoplastic elastomer, an ethylene-α-olefin copolymer and a hydrocarbon oil (e.g., Japanese Patent Laid-Open Publications No. Hei 8-231817, Hei 9-316287, Hei 10-53688 and Hei 11-21415). Although the thermoplastic elastomer compositions described in these publications have a high moldability and molded products made from these compositions exhibit a high softness, rubber elasticity, mechanical strength, and, in some cases, a high transparency, none has shown sufficient scratch resistance and/or abrasion resistance. Some of these compositions even lack desired oil resistance. For these reasons, the thermoplastic elastomer compositions are not necessarily suited for applications where high scratch resistance, abrasion resistance and oil resistance are required, in particular for the application of footgear soles. Such a drawback needs to be addressed.

Another type of thermoplastic elastomer composition is known, which is mainly used for the purpose of the slush molding and is composed of a styrene thermoplastic elastomer, two different types of ethylene-α-olefin copolymers and a polypropylene resin composition (Japanese Patent Laid-Open Publication No. Hei 10-279738). This thermoplastic elastomer composition, however, lacks sufficient softness and rubber elasticity, and thus is not necessarily suited for applications where a particular property of elastomer (elasticity) is of significant importance.

There is also known a polymer composition that is prepared by adding an organic peroxide to a particular thermoplastic elastomer composition and then melting and kneading the mixture. This thermoplastic elastomer composition contains a styrene thermoplastic elastomer, a rubber softening agent, a polyethylene or an ethylene copolymer, which has been polymerized by a single-site catalyst, and a propylene polymer (Japanese Patent Laid-Open Publications No. Hei 10-251480 and 2000-17141). However, the polymer composition described in these publications also lacks sufficient softness or rubber elasticity and thus is not sufficiently suited for applications where a particular property of elastomer (elasticity) is of significant importance. The polymer composition also needs to be improved since the molded products formed from the polymer composition have a slimy texture and the polymer composition lacks sufficient mechanical strength.

As for the shoe soles made of the thermoplastic elastomer, various proposals have been made thus far in an effort to achieve physical properties suitable for shoe soles. For example, a thermoplastic resin composition for use in shoe soles has been developed with the intention of improving weather resistance, heat resistance and oil resistance. This thermoplastic resin composition is prepared by first obtaining a composition by adding to a particular styrene thermoplastic elastomer, a rubber softening agent, a particular polypropylene polymer and, if necessary, polyethylene, and then crosslinking the composition by an organic peroxide (Japanese Patent Laid-Open Publication No. 2000-139503). Another type of thermoplastic elastomer composition intended for use in shoe soles or other applications contains an epoxidized diene block copolymer and a polyurethane elastomer (Japanese Patent Laid-Open Publication No. 2000-186197). Also known is a shoe sole made of a block copolymer consisting of polymer blocks of isobutylene and polymer blocks of a vinyl aromatic compound (Japanese Patent Laid-Open Publication No. 2000-290331).

However, none of the above-described known compositions for use in shoe soles or none of the shoe soles made of such a composition is known to simultaneously possess all of the essential performances required for footgear soles, such as shoe soles, in particular such performances as high abrasion resistance, hydrolysis resistance, grip, shock absorbance, oil resistance, mechanical strength, softness and lightweightness. Thus, these compositions are far from satisfactory for use in shoe soles.

Accordingly, it is an objective of the present invention to provide a thermoplastic elastomer composition that simultaneously possesses high moldability, abrasion resistance, scratch resistance, hydrolysis resistance, softness, rubber elasticity, grip, shock absorbance, oil resistance and lightweightness, and can thus be effectively used in various applications.

It is another objective of the present invention to provide a thermoplastic elastomer composition for use in footgear soles, as well as a footgear sole, that simultaneously possesses all of the essential properties required for footgear soles, namely, high abrasion resistance, scratch resistance, hydrolysis resistance, grip, shock absorbance, oil resistance, mechanical strength, softness and lightweightness.

DISCLOSURE OF THE INVENTION

The present inventors have devoted significant effort to finding a way to achieve the above-described objectives and, as a result, have made a finding that a polymer composition of a particular domain-matrix structure (morphology), in which fine particles of a styrene thermoplastic elastomer have been dispersed throughout a continuous phase (matrix), can be obtained by using an olefin copolymer of a particular density as the olefin copolymer used in the thermoplastic polymer composition described in the foregoing Japanese Patent Laid-Open Publications No. Hei 9-316287 and Hei 10-53688 applied by the present applicant; choosing a mixing ratio of the styrene thermoplastic elastomer to the olefin copolymer within a particular range; and carrying out dynamic crosslinking by adding a predetermined amount of organic peroxide to the polymer composition, such that the olefin copolymer forms the continuous phase.

Through extensive studies of the physical properties of the polymer composition having this particular phase structure, as well as of the molded products made from such a polymer composition, the present inventors have made a further finding that the polymer composition, as well as the molded products made of the polymer composition, exhibits various improved properties, including moldability, abrasion resistance, scratch resistance, hydrolysis resistance, softness, rubber elasticity, grip, shock absorbance, oil resistance and lightweightness, and has these properties in a well-balanced manner, so that it can be effectively used in various applications, including footgear soles. In this way, the present invention has been brought to completion.

Thus, according to the present invention, there is provided:

(1) a polymer composition obtainable by subjecting a crosslinkable polymer composition to dynamic crosslinking, the crosslinkable polymer composition containing:

(a) a block copolymer comprising two or more polymer blocks A of a vinyl aromatic compound and one or more polymer blocks B of a conjugated diene, which is either hydrogenated or unhydrogenated;

(b) an olefin copolymer having a density of 0.88 to 0.92 g/cm$^2$ and obtained through copolymerization of ethylene and an α-olefin having 4 to 12 carbon atoms;

(c) a softening agent; and (d) an organic peroxide in respective amounts that satisfy the following relational expressions ① to ③:

$$0.66 \leq Wb/Wa \leq 4 \quad \text{①}$$

$$0 \leq Wc/(Wa+Wb+Wc) \leq 0.25 \quad \text{②}$$

$$0.001 \leq Wd/(Wa+Wb+Wc) \leq 0.01 \quad \text{③}$$

wherein Wa, Wb, Wc and Wd represent the respective amounts (by mass) of the block copolymer (a), the olefin copolymer (b), the softening agent (c) and the organic peroxide (d) that are present in the polymer composition prior to the dynamic crosslinking.

Among specific embodiments of the present invention are:

(2) The polymer composition as described in (1) above that has a domain-matrix structure in which particles of the block copolymer (a) are dispersed in a matrix phase including the olefin copolymer (b);

(3) The polymer composition as described in (1) or (2) above further containing a rubber reinforcing agent (e) in an amount that satisfies the following relational expression ④:

$$We/(Wa+Wb+Wc) \leq 0.3 \quad \text{④}$$

wherein Wa, Wb, Wc and We represent the respective amounts (by mass) of the block copolymer (a), the olefin copolymer (b), the softening agent (c) and the rubber reinforcing agent (e) that are present in the polymer composition prior to the dynamic crosslinking;

(4) The polymer composition as described in any of (1) to (3) above further containing a blowing agent (f);

(5) The polymer composition as described in any of (1) to (4) above further containing a lubricant (g) in an amount that satisfies the following relational expression ⑤:

$$Wg/(Wa+Wb+Wc) \leq 0.3 \quad \text{⑤}$$

wherein Wa, Wb, Wc and Wg represent the respective amounts (by mass) of the block copolymer (a), the olefin copolymer (b), the softening agent (c) and the lubricant (g) that are present in the polymer composition prior to the dynamic crosslinking; and (6) The polymer composition as described in any of (1) to (4) above for use in footgear soles.

According to the present invention:

(7) there is also provided a footgear sole comprising the polymer composition as described in any of (1) to (4) and (6) above.

BEST MODE FOR CARRYING OUT THE INVENTION

Examples of the vinyl aromatic compound, the constituent of the polymer block A of the block copolymer (a) used in the polymer composition of the present invention, include styrene, α-methylstyrene, o-methylstyrene, m-methylstyrene, p-methylstyrene, p-t-butylstyrene, 2,4-dimethylstyrene, 2,4,6-trimethylstyrene, vinylnaphthalene and vinylanthracene. The polymer block A may include one or two or more these vinyl aromatic compounds. Of these, the polymer block A is preferably formed of styrene, p-methylstyrene and/or α-methylstyrene.

If necessary, the polymer block A may further include a small amount (preferably, 10% by mass or less of the amount of the polymer block A) of one or two or more of structural units derived from unsaturated monomers other than the vinyl aromatic compounds (e.g., 1-butene, pentene, hexene, butadiene, isoprene, methyl vinyl ether, methyl methacrylate and vinyl acetate), as long as the structural units do not interfere with the objectives of the present invention and its intended effects.

Examples of the conjugated diene, the constituent of the polymer block B of the block copolymer (a), include butadiene, isoprene, 2,3-dimethyl-1,3-butadiene, 1,3-pentadiene and 1,3-hexadiene. The polymer block B may include one or two or more of these conjugated dienes. Of these, the polymer block B is preferably formed of one or both of butadiene and isoprene.

The conjugated diene in the polymer block B may be of any microstructure. For example, butadiene molecules may undergo 1,2-addition and/or 1,4-addition to form the polymer block B. In the case of isoprene, the molecules may undergo 1,2-addition, 3,4-addition and/or 1,4-addition to form the polymer block B. The conjugated diene may be of any of these microstructures. When the polymer block B is formed of butadiene alone, it is preferred that 20 to 70 mol % of the polymer block B is formed of 1,2-addition and 30 to 80 mol % of the polymer block B is formed of 1,4-addition. When the polymer block B is formed of isoprene alone or both of isoprene and butadiene, it is preferred that 3,4-addition and 1,2-addition add to 5 to 70 mol % of the polymer block B.

When the polymer block B is made of two or more different conjugated dienes (for example, butadiene and isoprene), the molecules are bound to one another so that the molecules of the different types of diene are arranged either in a perfectly alternating manner, in a random manner, in a tapered manner, in a manner such that the molecules form partial blocks, or in any combination of two or more of the above.

While the carbon-carbon double bonds in the polymer block B that come from the conjugated diene may or may not be hydrogenated either partially or entirely, preferably 70 mol % or more, more preferably 90 mol % or more of the carbon-carbon double bonds that come from the conjugated diene are hydrogenated considering the heat resistance and weather resistance.

The degree of hydrogenation can be determined by measuring the content of the carbon-carbon double bonds in the polymer block B that come from the conjugated diene before and after the hydrogenation by means of iodine value, IR spectrophotometry or NMR, and comparing the results.

If necessary, the polymer block B may further include a small amount (preferably, 10% by mass or less of the amount of the polymer block B) of one or two or more of structural units derived from unsaturated monomers other than the conjugated diene (e.g., 1-butene, 1-pentene, 1-hexene, methyl vinyl ether, styrene and methyl methacrylate), as long as the structural units do not interfere with the objectives of the present invention and its intended effects.

The polymer blocks A and the polymer blocks B may bind to one another in the block copolymer (a) in any manner of binding so that the resulting block copolymer (a) has either straight-chained, branched, or radial form, or combination of two or more of the above, provided that the block copolymer (a) includes two or more of the polymer blocks A and one or more of the polymer blocks B, bound to one another. Of the possible manners of binding, the polymer blocks A and the polymer blocks B are preferably bound to one another to form a straight chain. For example, assuming 'A' to be a single polymer block A and 'B' to be a single polymer block B, the block copolymer may take the form of a triblock copolymer with the structure of A-B-A, a tetrablock copolymer with the structure of A-B-A-B, or a pentablock copolymer with the structure of A-B-A-B-A. Of these, triblock copolymer (A-B-A) is preferred, considering the readiness of the block copolymer production and the softness of the block copolymer. It should be noted that two or more different types of block copolymer, each having a different degree of hydrogenation of the polymer block B, may be used together to form a block copolymer (a).

The amount of the structural unit derived from the vinyl aromatic compound in the block copolymer (a) is preferably in the range of 5 to 45% by mass in view of rubber elasticity, softness, grip and shock absorbance of the polymer composition and the molded products formed thereof. The amount of the structural unit derived from the vinyl aromatic compound in the block copolymer (a) can be determined by $^1$H-NMR spectroscopy.

Preferably, the block copolymer (a) has a number average molecular weight in the range of 50,000 to 300,000 in view of moldability of the polymer composition, rubber elasticity and mechanical strength of the polymer composition and the molded products formed thereof. More preferably, the block copolymer has a number average molecular weight in the range of 50,000 to 200,000 since the resulting molded products have smooth and glossy surfaces.

The term "number average molecular weight" as used herein refers to a molecular weight relative to the polystyrene standards and determined by gel permeation chromatography (GPC).

If necessary, the block copolymer (a) may include within, and/or on terminals of, its molecular chain, one or two or more functional groups including carboxyl, hydroxyl, acid anhydride, amino and epoxy, provided that the advantages of the present invention are not affected. A mixture of a block copolymer (a) with functional groups and that without functional groups may be used to serve as the block copolymer (a).

The block copolymer (a) can be produced by any known method. For example, it can be produced by ionic polymerization, such as anionic polymerization and cationic polymerization, or radical polymerization. In the case of anionic polymerization, using for example an alkyllithium compound as a polymerization initiator, vinyl aromatic compounds and conjugated dienes are allowed to undergo sequential polymerization in an organic solvent inert to polymerization reaction, such as n-hexane and cyclohexane, to produce the block copolymer. If necessary (preferably), the resulting block copolymer is hydrogenated according to a known technique in an inert organic solvent in the presence of a hydrogenation catalyst.

The olefin copolymer (b) for use in the polymer composition of the present invention is an olefin copolymer that has a density of 0.88 to 0.92 g/cm$^3$ and is obtained through copolymerization of ethylene and an α-olefin having 4 to 12 carbon atoms.

Examples of the α-olefin having 4 to 12 carbon atoms used to form the olefin copolymer (b) include 1-butene, 2-methyl-1-butene, 3-methyl-1-butene, 1-pentene, 4-methyl-1-pentene, 1-hexene, 1-octene, 1-decene and 1-dodecene. These α-olefins may be used individually or in combinations of two or more to provide the structural units of the olefin copolymer (b).

In the present invention, it is necessary that the olefin copolymer (b) have a density in the range of 0.88 to 0.92 g/cm$^3$ so that the scratch resistance, abrasion resistance, softness, rubber elasticity, shock absorbance and oil resistance of the polymer composition and the molded products formed thereof are maintained in the proper range. The olefin copolymer (b) with a density of less than 0.88 g/cm$^3$ fails to provide the polymer composition and the molded products formed thereof with a sufficient scratch resistance, abrasion resistance, mechanical strength and oil resistance, whereas the olefin copolymer (b) with a density exceeding 0.92 g/cm$^3$ results in a reduced softness, rubber elasticity and shock absorbance of the polymer composition and the molded products formed thereof.

The olefin copolymer (b) may be any of the known materials. For example, those that have a density of 0.88 to 0.92 g/cm$^3$ are selected from the products including ENGAGE series (product name) manufactured by DU PONT DOW ELASTOMERS L.L.C., EXACT series (product name) manufactured by EXXON CHEMICAL Co., Ltd., and N-series of ESPREN SPO (product name) manufactured by SUMITOMO CHEMICAL INDUSTRY Co., Ltd.

If necessary, the polymer composition of the present invention can contain a softening agent (c) for the purposes of improving the moldability and achieving a proper softness (hardness) and rubber elasticity, provided that the addition of the softening agent does not affect the scratch resistance and the abrasion resistance of the polymer composition.

The softening agent (c) may be any known softening agent, examples being hydrocarbon oils such as paraffin-based, naphthene-based and aromatic-based oils and liquid paraffin; vegetable oils such as peanut oil and rosin oil; phosphates; low molecular weight polymers such as chlorinated paraffin, low molecular weight polyethylene glycol, low molecular weight polyethylene, liquid polybutene, liquid polyisoprene and hydrogenated products thereof, and liquid polybutadiene and hydrogenated products thereof. These softening agents may be used either individually or in combinations of two or more. Among other softening agents, paraffin-based hydrocarbon oils are suitably used as the softening agent (c) in the present invention.

The polymer composition of the present invention is obtainable as a result of the dynamic crosslinking of a crosslinkable polymer composition (which may be referred to as "pre-crosslinked polymer composition," hereinafter) that contains an organic peroxide (d), either along with the block copolymer (a) and the olefin copolymer (b) or along with the block copolymer (a), the olefin copolymer (b) and the softening agent (c).

The organic peroxide (d) for use in the present invention may be any organic peroxide that can crosslink the block copolymer (a) and/or the olefin copolymer (b) under dynamic conditions. Examples of the organic peroxide (d) include 2,5-dimethyl-2,5-di(t-butylperoxy)hexane, 2,5-dimethyl-2,5-di(t-butylperoxy)hexyne-3, 2,5-dimethyl-2,5-di (benzoylperoxy)hexane, t-butylperoxybenzoate, dicumylperoxide, diisopropylbenzohydroperoxide, 1,3-bis(t-butylperoxyisopropyl)benzene and benzoyl peroxide. These organic peroxides may be used either individually or in combinations of two or more.

The term "dynamic crosslinking" as used herein refers to a process in which a softened or molten crosslinkable polymer composition containing an organic peroxide is forced to undergo crosslinking by application of shearing force (for example, by kneading, mixing, stirring, or dispersing).

While the temperature for the dynamic crosslinking may be adjusted depending on the types and the amounts of the components of the polymer composition, namely, the block copolymer (a), the olefin copolymer (b), and the organic peroxide (d), the process is preferably carried out at a temperature of 150 to 280° C., more preferably at a temperature of 180 to 240° C.

Furthermore, the polymer composition of the present invention must meet the following conditions: the ratio (by mass) of the amount of the olefin copolymer (b) to the amount of the block copolymer (a) must satisfy the following relational expression ①; the ratio (by mass) of the amount of the softening agent (c) to the total amount of the block copolymer (a), the olefin copolymer (b) and softening agent (c) must satisfy the following relational expression ②; and the amount of the organic peroxide (d) must satisfy the following relational expression ③. The relational expressions are:

$$0.66 \leq Wb/Wa \leq 4 \quad \text{①}$$

$$0 \leq Wc/(Wa+Wb+Wc) \leq 0.25 \quad \text{②}$$

$$0.001 \leq Wd/(Wa+Wb+Wc) \leq 0.01 \quad \text{③}$$

wherein Wa, Wb, Wc and Wd represent the respective amounts (by mass) of the block copolymer (a), the olefin copolymer (b), the softening agent (c) and the organic peroxide (d) that are present in the pre-crosslinked polymer composition.

If the value of Wb/Wa, the ratio (by mass) of the amount of the olefin copolymer (b) to the amount of the block copolymer (a) in the pre-crosslinked polymer composition, is smaller than 0.66, then the scratch resistance, abrasion resistance, oil resistance and mechanical strength of the polymer composition and the molded products formed thereof become insufficient. On the other hand, if the value of Wb/Wa is larger than 4.0, then the rubber elasticity, softness, grip and shock absorbance of the polymer composition and the molded products formed thereof are reduced.

Also, if the value of Wc/(Wa+Wb+Wc), that is, the ratio (by mass) of the amount of the softening agent (c) to the total amount of the block copolymer (a), the olefin copolymer (b) and the softening agent (c) exceeds 0.25, then the scratch resistance, abrasion resistance and mechanical strength of the polymer composition and the molded products formed thereof are reduced. For this reason, it is preferred that the value of Wc/(Wa+Wb+Wc) is 0.2 or less.

If the value of Wd/(Wa+Wb+Wc), that is, the ratio (by mass) of the amount of the organic peroxide (d) to the total amount of the block copolymer (a), the olefin copolymer (b) and the softening agent (c) is smaller than 0.001, then the scratch resistance, abrasion resistance and oil resistance of the polymer composition and the molded products formed thereof become insufficient. On the other hand, if the value of Wd/(Wa+Wb+Wc) exceeds 0.01, then the rubber elasticity, softness, grip, shock absorbance, mechanical strength and moldability of the polymer composition and the molded products formed thereof are reduced.

If necessary, a crosslinking aid may be used along with the organic peroxide (d) in the process of dynamic crosslinking. Examples of the crosslinking aid include acrylic monomers such as ethyleneglycol dimethacrylate, triallyl isocyanurate, divinylbenzene and liquid polybutadiene. These crosslinking aids may be used either independently or in combinations of two or more.

While the crosslinking aid may be used in any amount, it is preferably used in an amount of 0.1 to 5 mols, more preferably in an amount of 0.5 to 3 mols, with respect to 1 mol of the organic peroxide (d).

The polymer composition of the present invention, which is obtained through dynamic crosslinking by the organic peroxide (d), has a domain-matrix structure in which the block copolymer (a) substantially in the form of fine particles is dispersed throughout a matrix phase (continuous phase) substantially formed by the olefin copolymer (b). Having such a phase structure with the matrix phase formed substantially from the olefin copolymer (b), the polymer composition of the present invention effectively exhibits a high scratch resistance and abrasion resistance. In addition, the dispersed fine particle phase, formed from the block copolymer (a) having a high softness, rubber elasticity, grip and shock absorbance, significantly improves the same properties of the polymer composition as compared to the olefin copolymer (b) alone.

The domain-matrix structure of the polymer composition of the present invention can be observed by using, for example, a scanning electron microscope. For instance, the polymer composition is shaped into a 2 mm thick sheet by injection molding. The sheet is immersed in liquid nitrogen for cooling and is then immediately broken into pieces. At room temperature, the sample piece is immersed in cyclohexane for 5 minutes to etch the surface appearing upon breakage of the sample so that the block copolymer (a) is dissolved and removed from the surface without causing any physical damage. After drying, the sample piece is subjected to ion sputtering. Observation of the surface using a scanning electron microscope reveals the presence of dispersed empty pores (cavity) that are not connected to adjacent ones. This indicates that the particles substantially formed from the block copolymer (a) are dispersed, forming domains, throughout the matrix phase (continuous phase) substantially formed from the olefin copolymer (b) to give the domain-matrix structure of the polymer composition.

While the particles substantially formed from the block copolymer (a) and dispersed in the polymer composition of the present invention may have any particle size, it is preferred that the particles have a particle size such that the empty pores formed by the etching in the above-described series of steps, involving injection-molding of a 2 mm thick sheet, cooling in liquid nitrogen followed by breaking, etching by cyclohexane, ion sputtering, and observation with a scanning electron microscope, have an average major axis length (Ls) of 10 µm or less, more preferably 5 µm or less, when the average is taken for 1000 pores. The average major axis length (Ls) can be determined by the following equation: Ls=(Σn·L)/Σn (wherein L indicates major axis length of each pore (in µm) and n indicates the number of the pores).

If necessary, the polymer composition of the present invention may further contain a rubber reinforcing agent (e). Addition of the rubber reinforcing agent (e) imparts improved mechanical strength; scratch resistance and abrasion resistance to the surfaces of the molded products formed of the polymer composition.

The rubber reinforcing agent (e) may be any known agent, examples including carbon blacks such as HAF, HAF-HS, SAF and ISAF; carbon fibers; and organic fibrous materials such as poval-based fibril fibers, nylon fibers and polyester fibers. These rubber reinforcing agents may be used either individually or in combinations of two or more. Among other rubber reinforcing agents, carbon blacks, carbon fibers and/or organic fibrous materials are preferred since highly soft and lightweight molded products are readily fabricated from these materials.

Preferably, the amount of the rubber reinforcing agent (e), if added to the polymer composition of the present invention, satisfies the following relational expression:

$$We/(Wa+Wb+Wc) \leq 0.3 \qquad (4)$$

wherein Wa, Wb, and Wc are the same as defined above, and We represents the amount (by mass) of the rubber reinforcing agent (e) in the pre-crosslinked polymer composition.

If the value of We/(Wa+Wb+Wc), that is, the ratio (by mass) of the amount of the rubber reinforcing agent (e) to the total amount of the block copolymer (a), the olefin copolymer (b) and the softening agent (c) is larger than 0.3, then the softness, rubber elasticity, shock absorbance and moldability of the polymer composition and the molded products formed thereof may be reduced. It is particularly preferred that the value of We/(Wa+Wb+Wc) is 0.25 or less.

The polymer composition of the present invention may further contain a blowing agent (f) for producing lightweight, inexpensive products. The blowing agent (f) may be any of known inorganic and/or organic blowing agents. Examples include carbonates such as sodium bicarbonate and ammonium bicarbonate; organic acids such as citric acid and oxalic acid; azo-compounds such as azodicarboxamide, barium azodicarboxylate and azobisisobutyronitrile; nitroso-comounds such as dinitrosopentamethylenetetramine and dinitrosoterephthalamide; sulfonyl hydrazides such as toluenesulfonylhydrazide. These blowing agents may be used either individually or in combinations of two or more. Among other blowing agents, azodicarboxamide and/or sulfonyl hydrazides are preferred.

A known blowing auxiliary agent such as urea and derivatives of urea may be used in conjunction with the blowing agent (f).

If the blowing agent (f) has a property to decompose at a lower temperature than the temperature to heat the composition during dynamic crosslinking or kneading to obtain the composition, the blowing agent should be added after dynamic crosslinking and/or kneading. In this regard, the agent may be added before the crosslinked polymer composition is fed to the molding apparatus or it may be added directly to the molding apparatus. Conversely, if the blowing agent (f) decomposes at a higher temperature than the temperature to heat the polymer composition during the dynamic crosslinking or kneading process, it may be added either before, during, or after the dynamic crosslinking or the kneading process. The blowing agent (f) may be added by means of masterbatch.

The amount of the blowing agent (f) can be adjusted depending on the use of the polymer compositions. When the polymer composition of the present invention is intended for use in footgear soles such as shoe soles, the blowing agent (f) is preferably used in an amount of 0.1 to 10% by mass with respect to the total mass of the block copolymer (a), the olefin copolymer (b) and the softening agent (c). In other word, it is preferred that the amount (by mass) of the blowing agent (Wf) is such that the value of Wf/(Wa+Wb+Wc) falls within the range of 0.001 to 0.1 from the viewpoint of physical properties and appearances of the footgear soles.

If necessary, the polymer composition of the present invention may further contain a lubricant (g). Addition of the lubricant (g) reduces the frictional resistance of surfaces of the molded products formed of the polymer composition, thereby improving the scratch resistance and abrasion resistance.

When the polymer composition of the present invention is intended for use, such as footgear soles, in which firm grip is required, use of the lubricant (g) is preferably avoided since grip is reduced due to the reduced friction, making the foot gear soles slippery. The shoe soles with reduced grip may result in wearers falling.

The lubricant (g) may be any known lubricant. Examples include silicone compounds such as silicone oil and silicone polymer fine powder (powder of block copolymer composed of silicone/acrylic polymers); fluorinated compounds such as fluorinated hydrocarbon oil and polytetrafluoroethylene; polyalkylene oxides such as polyethylene oxide and polypropylene oxide; ester oils; and super-high molecular weight polyethylene fine powder. These lubricants may be used either individually or in combinations of two or more.

Preferably, the amount of the lubricant (g), if added to the polymer composition of the present invention, satisfies the following relational expression (5):

$$Wg/(Wa+Wb+Wc) \leq 0.3 \qquad (5)$$

wherein Wa, Wb and Wc are the same as defined above, and Wg represents the amount (by mass) of the lubricant (g) in the pre-crosslinked polymer composition.

If the value of Wg/(Wa+Wb+Wc), that is, the ratio (by mass) of the amount of the lubricant (g) with respect to the total amount of the block copolymer (a), the olefin copolymer (b) and the softening agent (c) is larger than 0.3, mechanical strength of the polymer composition and the molded products formed thereof may be reduced. It is thus particularly preferred that the value of Wg/(Wa+Wb+Wc) is 0.1 or less.

If necessary, the polymer composition of the present invention may contain other thermoplastic polymers other than the block copolymer (a) or the olefin copolymer (b), as well as other fillers other than the rubber reinforcing agent (e), provided that the advantages of the present invention are not affected.

Examples of the additional thermoplastic polymer include styrene resins such as polystyrene, poly(α-methylstyrene) and styrene-acrylonitrile copolymer; styrene block copolymers different from the block copolymer (a) (e.g., styrene diblock copolymer), and polyphenylene oxide resin. These thermoplastic polymers may be used either individually or in combinations of two or more.

Examples of the additional filler other than the rubber reinforcing agent (e) include inorganic fillers such as calcium carbonate, talc, silica and diatomaceous earth; and organic fillers such as rubber powder and wood powder. These fillers may be used either individually or in combinations of two or more.

If necessary, the polymer composition of the present invention may further contain a thermal stabilizer, an antioxidant, a light stabilizer, a flame retardant, an antistatic agent, a pigment and other additives.

The dynamically crosslinked polymer composition of the present invention can be prepared by any conventional technique that is used to produce thermoplastic polymer compositions. For example, a single screw extruder, a twin screw extruder, a Banbury mixer, a brabender, an open roll, or a kneader may be used to knead the composition while the composition undergoes crosslinking with the organic peroxide (d). In this manner, the dynamically crosslinked polymer composition of the present invention is obtained. The polymer composition is preferably kneaded at a temperature of 150 to 280° C., more preferably at a temperature of 180 to 240° C.

The kneading process may be carried out by any of the following methods:

[1] knead all of the components of the polymer composition, including the organic peroxide (d), at a time so that dynamic crosslinking takes place while the composition is kneaded;

[2] first knead all of the components except for the organic peroxide (d) and then add the organic peroxide (d). Further knead the mixture to carry out dynamic crosslinking.

[3] knead the three components of the block copolymer (a), the olefin copolymer (b) and the organic peroxide (d) while allowing dynamic crosslinking to take place. Subsequently add the other components (e.g., the softening agent (c), the rubber reinforcing agent (e), the blowing agent (f), and the lubricant (g)) and further knead the mixture; and

[4] first knead all of the components except for the olefin copolymer (b) and the organic peroxide (d) and then add the olefin copolymer (b) and the organic peroxide (d). Further knead the mixture.

In each of the methods [1] to [4], the components of the composition to be kneaded are preferably dry-mixed with each other before fed to the kneader by using a mixer such as a Henschel mixer and a tumbler, rather than directly feeding individual components to the kneader.

The polymer composition of the present invention can be formed into various shapes, such as sheet, film, tube, blow-molded products, molded products and other molded articles, by using known techniques such as extrusion molding, injection molding, blow molding, compression molding and calendering. The polymer composition of the present invention may be used to form composite materials with other materials (e.g., polymer materials such as polyethylene, polypropylene, polyamide and ABS resin, metal, wood, and cloths) by using two-color molding technique.

The polymer composition of the present invention has various improved properties, such as moldability, abrasion resistance, scratch resistance, hydrolysis resistance, softness, rubber elasticity, grip, shock absorbance, oil resistance, lightweightness and mechanical strength, and thus is effectively used in various applications. Specific examples include soles and bodies of various footgears (such as shoes, sandals, scuffs and Japanese sandals), packing materials for articles of daily use, packing materials for industrial materials, film, sheet, mats, hose, tube, wire covering, belt, plastic pallet, grommets for home electric appliances, parts of home electric appliances such as cleaner nozzles, rollers, casters, rubber base and gaskets for refrigerator, parts of office appliances such as feeder rollers and winder rollers of photocopiers or the like, furniture such as sofa and chair sheet, floor materials and building materials such as coated steel plates and coated plywood, packings for sealing doors and window frames, interior or exterior automobile parts such as bumper parts and opening trim seals, grip materials for various appliances and tools (e.g., scissors, screwdrivers, toothbrushes, ski sticks and pens), sports equipment such as water goggles and snorkels, medical instruments such as syringe gaskets and catheters, leisure equipment, stationery, and toys.

The enhanced abrasion resistance, scratch resistance, hydrolysis resistance, grip, shock absorbance and oil resistance make the polymer composition of the present invention particularly suitable, among other applications, for materials of soles of various footgear including shoes, sandals, Japanese sandals and scuffs, in particular materials for shoe soles.

Because of the various improved properties, the footgear soles made from the polymer composition of the present invention are less susceptible to wear, scratches, and weathering by exposure to rain or oil and is considerably less slippery. Moreover, the improved shock absorbance and cushion significantly reduce damage to feet (legs) and waists.

The footgear soles formed of the polymer composition of the present invention may be produced by any known method that is traditionally used in the production of footgear soles. For example, soles of footgear may be injection-molded from the polymer composition of the present invention while the body of the footgear, or the rest of the footgear other than the sole, is placed in the molds of an injection molder so that the sole is joined to the body as it is injection-molded. Alternatively, footgear soles may be separately formed from the polymer composition of the present invention and subsequently adhered to the bottom of the body of the footgear using an adhesive or the like. Also, the entire footgear may be integrally formed from the polymer composition of the present invention by injection-molding or other similar techniques.

EXAMPLES

The present invention will now be described in detail with reference to Examples, which are only illustrative and are not intended to limit the scope of the invention in any way.

In the following Examples, the size of the dispersed particles in the polymer composition, the moldability, the scratch resistance, the abrasion resistance, the rubber elasticity (permanent set), the softness (hardness), the tensile strength, the tear strength, the hydrolysis resistance, the grip, the shock absorbance, the oil resistance, the lightweightness and the expansion ratio of the polymer composition are measured and tested according to the following methods.

(i) The Size of the Dispersed Particles in the Polymer Composition 2 mm thick sheets injection-molded from the respective polymer compositions obtained in the following Examples were cooled in liquid nitrogen and were broken apart into pieces. The surfaces appearing upon breakage of the sheets were etched in cyclohexane for 5 minutes, dried, and subjected to ion sputtering. Using a scanning electron microscope (JSM-T100 manufactured by JEOL DATUM Co., Ltd.), the surfaces were then observed to ensure that particles of the block copolymer phase were dispersed in the matrix phase of the olefin copolymer. A further etching process was performed to dissolve and thereby remove the block copolymer. The major axis lengths of the resulting empty pores were then measured, and the average was taken over 1000 pores to serve as the size of the dispersed particles.

(ii) The Moldability

As an index of the moldability of the polymer composition, the melt flow rate (MFR) was measured for each of the polymer compositions obtained in the following Examples according to JIS K 7210 at 230° C. while a 5 kg load was applied.

(iii) The Scratch Resistance (a Reciprocal Slide Test Using Cotton Cloths)

Sheet-like sample pieces, each sized 50 mm×100 mm×2 mm, were injection-molded from the respective polymer compositions obtained in the following Examples. A surface of each sample piece was rubbed with a piece of cotton cloth by sliding the cotton cloth back and forth over a distance of 140 mm/cycle while a load was applied. The rubbing was continued for 10 minutes (1 reciprocating movement per second). With varying load, the test was continued until scratches were formed on the surface. The load that caused the scratch was measured as an index for the scratch resistance. A higher scratching load corresponds to a higher scratch resistance.

(iv) The Abrasion Resistance (The Amount of Abrasion)

2 mm thick disk-shaped sample pieces were injection-molded from the respective polymer compositions obtained in Examples 1 to 18 and Comparative Examples 1 to 7, and as an index of the abrasion resistance, Taber abrasion was measured for each sample piece according to JIS K 6264. In the test, an abrader wheel equivalent to H22 as specified in the Japanese Industrial Standards (JIS) was used.

On the other hand, ring-shaped sample pieces, each having a diameter of 63.5 mm, a thickness of 12.7 mm, and a central hole diameter of 12.7 mm, were injection-molded from each of the polymer compositions of Examples 19 to 22 and Comparative Examples 8 to 10. As an index of the abrasion resistance, Akron abrasion was measured for each sample piece according to JIS K 6264. In the test, an abrader wheel equivalent to 40P as specified in the Japanese Industrial Standards (JIS) was used.

(v) The Rubber Elasticity (Permanent Set)

2 mm thick sheets were injection-molded from the respective polymer compositions obtained in the following Examples. Dumbbell-shaped #1 sample pieces were die cut from the sheets. Each sample was stretched by 100% and was measured for the permanent set according to JIS K 6262 to serve as an index for the rubber elasticity. A lower permanent set corresponds to a higher rubber elasticity.

(vi) The Softness (Hardness)

Sheet-like sample pieces, each sized 110 mm×110 mm×2 mm, were injection-molded from the respective polymer compositions obtained, in the following Examples. As an index for the softness, hardness was measured for each sample according to JIS K 6235 by using a type A durometer.

(vii) The Tensile Strength 2 mm thick sheets were injection-molded from the respective polymer compositions obtained in the following Examples. Dumbbell-shaped #5 sample pieces were die cut from the sheets. Each sample was subjected to the tensile test, in which the breaking strength was measured for each sample according to JIS K 6251 as an index for the tensile strength.

(viii) The Tear Strength 2 mm thick sheets were injection-molded from the respective polymer compositions obtained in the following Examples. Angled sample pieces without cutout were die cut from the sheets. Each sample was subjected to the tear test, in which the tear strength was measured for each sample according to JIS K 6252.

(xi) The Hydrolysis Resistance 2 mm thick sheets were injection-molded from the respective polymer compositions obtained in the following Examples. Dumbbell-shaped #5 sample pieces were die cut from the sheets. Each sample was tested for the resistance to moisture and heat at a temperature of 70° C. and at a humidity of 95% RH for 6 weeks. The proportion of the breaking strength retained after the test with respect to the initial breaking strength was determined to serve as an index for the hydrolysis resistance.

(x) The Grip 2 mm thick sample pieces were injection-molded from the respective polymer compositions obtained in the following Examples. Using a friction tester (TRIBOGEAR 140R manufactured by SHINTO SCIENTIFIC Co., Ltd.), coefficient of kinetic friction was measured for each sample under a load of 50 g and at a tension speed of 75 mm/min. The samples with the coefficient of kinetic friction of 0.80 or higher were rated as "good," indicating improved grip (as indicated by a circle), whereas the samples with the coefficient of kinetic friction less than 0.80 were rated as "bad," indicating insufficient grip (as indicated by a cross).

(xi) The Shock Absorbance

Disk-shaped sample pieces, each 2 mm thick and 50 mm in diameter, were injection-molded from the respective polymer compositions obtained in the following Examples. A 1 g steel sphere was dropped from 10 cm above onto the center of each of the sample. When the steel sphere bounced off the surface of the sample to a height of less than 2 cm, the samples were rated as "good," indicating improved shock absorbance (as indicated by a circle). Conversely, when the steel sphere bounced off the surface of the sample to a height of 2 cm or higher, the samples were rated as "bad," indicating insufficient shock absorbance (as indicated by a cross).

(xii) The Oil Resistance 2 mm thick sheets were injection-molded from the respective polymer compositions obtained in the following Examples. Dumbbell-shaped #5 sample pieces were die cut from the sheets. Each sample was tested for the oil resistance according to JIS K 6258 at a temperature of 25° C. for 7 days using a JIS #3 oil. The volume of each sample piece was measured before and after the test and the change in volume was determined in percentage. The samples with the volume change of less than 20% were rated as "good," indicating improved oil resistance (as indicated by a circle), whereas the samples with the volume change of 20% or higher were rated as "bad," indicating insufficient oil resistance (as indicated by a cross).

(xiii) The Lightweightness

Sheet-like sample pieces, each sized 30 mm×30 mm×2 mm, were injection-molded from the respective polymer compositions of the following Examples. The specific gravity of each sample was measured by the water replacement method according to JIS K 7112. The samples with a specific gravity of less than 1.0 were rated as "good," indicating improved lightweightness (as indicated by a circle), whereas the samples with a specific gravity of 1.0 or higher were rated as "bad," indicating insufficient lightweightness (as indicated by a cross).

(xiv) The Expansion Ratio

Sample pieces (foam), each sized 30 mm×30 mm×2 mm, were injection-molded from the respective polymer compositions of the following Examples. The expansion ratio of each sample piece was determined by dividing the specific gravity of each sample piece by the specific gravity of the polymer composition before foaming.

Components used in the following Examples and their respective short names are as follows:

Block Copolymer:

a-1: SEPTON 4055 (product name) (manufactured by KURARAY Co., Ltd.) [a hydrogenated product of a triblock copolymer including polystyrene-poly(butadiene/isoprene)-polystyrene (SEEPS)]

a-2: SEPTON 4033 (product name) (manufactured by KURARAY Co., Ltd.) [a hydrogenated product of a triblock copolymer including polystyrene-poly(butadiene/isoprene)-polystyrene (SEEPS)]

Olefin Copolymer b-1: ENGAGE 8402 (product name) (manufactured by DU PONT DOW ELASTOMERS L.L.C.) (Density=0.90 g/cm$^3$)

b-2: ENGAGE 8401 (product name) (manufactured by DU PONT DOW ELASTOMERS L.L.C.) (Density=0.89 g/cm$^3$)

b-3: ENGAGE 8400 (product name) (manufactured by DU PONT DOW ELASTOMERS L.L.C.) (Density=0.87 g/cm$^3$)

b-4: ENGAGE 8480 (product name) (manufactured by DU PONT DOW ELASTOMERS L.L.C.) (Density=0.90 g/cm$^3$)

b-5: AFFINITY HF1030 (manufactured by DU PONT DOW ELASTOMERS L.L.C.) (Density=0.94 g/cm$^3$)

Softening Agent:

c-1: DIANA PROCESS OIL PW-380 (product name) (manufactured by IDEMITSU PETROCHEMICAL Co., Ltd.) (paraffin-based process oil)

Organic Peroxide:

d-1: PERHEXYNE 25B-40 (product name) (manufactured by Nippon Oil and Fat Corporation)

Rubber Reinforcing Agent:

e-1: SHOWBLACK N330 (product name) (manufactured by SHOWA CABOT Co., Ltd.) (HFA carbon)

Blowing Agent:

f-1: FINEBLOW BX-037 (product name) (manufactured by MITSUBISHI CHEMICAL Corporation) (azodicarboxamide containing masterbatch)

Lubricant g-1: KF-96-300CS (manufactured by SHIN-ETSU CHEMICAL Co., Ltd.) (silicone oil)

Examples 1 to 18 and Comparative Examples 1 to

<1> Components of respective compositions were mixed according to the formulae shown in Tables 1 to 6 below. After thoroughly mixed in a mixer, the resulting mixtures were each fed to a twin screw extruder (TEM-35B manufactured by TOSHIBA MACHINE Co., Ltd.) and were kneaded for about 5 minutes at 230° C. Subsequently, each mixture was extruded to form strands, which were then cut to form pellets of the polymer composition. The polymer compositions of Examples 1 to 18 and Comparative Examples of 1 to 3 and 5, each of which contained the organic peroxide, were allowed to undergo dynamic crosslinking during kneading.

The moldability (MFR) measured by the above-described method is shown for each of the resulting polymer compositions in Tables 1 to 6 below:

<2> Using an injection molder (IS-55EPN, manufactured by TOSHIBA MACHINE Co., Ltd.) at a cylinder temperature of 230° C. and at a mold temperature of 50° C., the pellets of the polymer compositions obtained in <1> above were formed into molded articles of predetermined shape. A silicon-based mold release agent was used to help remove the articles from the molds. According to the above-described methods, the resulting molded articles were used to determine and rate the size of the dispersed particles, the scratch resistance, the abrasion resistance, the rubber elasticity (permanent set), the softness (hardness), the tensile strength and the tear strength. The results are as shown in Tables 1 to 6 below.

TABLE 1

|  | ex. 1 | ex. 2 | ex. 3 | ex. 4 |
|---|---|---|---|---|
| [polymer composition (by mass)] | | | | |
| block copolymer: | | | | |
| a-1 | 25 | | | 25 |
| a-2 | | 25 | 25 | |
| olefin copolymer: | | | | |
| b-1(density: 0.90 g/cm$^3$) | 65 | 65 | | |
| b-3(density: 0.87 g/cm$^3$) | | | | |
| b-4(density: 0.90 g/cm$^3$) | | | 65 | 65 |
| softening agent (c-1) | 10 | 10 | 10 | 10 |
| organic peroxide (d-1) | 0.3 | 0.3 | 0.3 | 0.3 |
| crosslinking aid[1] | 0.2 | 0.2 | 0.2 | 0.2 |
| [structure and properties] | | | | |
| size of the dispersed particles (μm) | 0.3 | 0.7 | 2.2 | 0.3 |
| Moldability(MFR)(g/10 min) | 12 | 40 | 7.3 | 1.2 |
| Scratch resistance(load)(MPa) | 0.098 | 0.098 | 0.049 | 0.098 |
| Abrasion resistance (amount of abrasion)(cm$^3$) | 0.035 | 0.048 | 0.013 | 0.007 |
| Rubber elasticity (permanent set)(%) | 14 | 12 | 10 | 17 |
| Softness (hardness) | 81 | 81 | 80 | 82 |
| Tensile strength (MPa) | 31.9 | 28.2 | 27.1 | 30.5 |
| Tear strength (N/mm) | 54.7 | 50.9 | 57.4 | 57.7 |

[1]TAIC M-60 (product name) (NIPPON KASEI Co., Ltd.) (Triallyl Isocyanurate)

TABLE 2

|  | cf. 1 | cf. 2 | cf. 3 | cf. 4 |
| --- | --- | --- | --- | --- |
| [polymer composition (by mass)] | | | | |
| block copolymer: | | | | |
| a-1 | 60 | 30 | 25 | 25 |
| a-2 | | | | |
| olefin copolymer: | | | | |
| b-1(density: 0.90 g/cm³) | 30 | 40 | | 65 |
| b-3(density: 0.87 g/cm³) | | | 65 | |
| b-4(density: 0.90 g/cm³) | | | | |
| softening agent (c-1) | 10 | 30 | 10 | 10 |
| organic peroxide (d-1) | 0.3 | 0.3 | 0.3 | — |
| crosslinking aid[1] | 0.2 | 0.2 | 0.2 | — |
| [structure and properties] | | | | |
| size of the dispersed particles (μm) | 35 | 27 | 1.5 | 1.1 |
| Moldability(MFR)(g/10 min) | 0.0 | 15 | 28 | 17 |
| Scratch resistance(load)(MPa) | 0.025 | 0.010 | 0.010 | 0.049 |
| Abrasion resistance (amount of abrasion) (cm³) | 0.205 | 0.203 | 0.250 | 0.097 |
| Rubber elasticity (permanent set)(%) | 7 | 5 | 10 | 12 |
| Softness (hardness) | 63 | 60 | 69 | 81 |
| Tensile strength (MPa) | 17.1 | 11.7 | 13.4 | 32.6 |
| Tear strength (N/mm) | 35.3 | 29.8 | 30.1 | 62.0 |

[1] TAIC M-60 (product name) (NIPPON KASEI Co., Ltd.) (Triallyl Isocyanurate)

TABLE 3

|  | ex. 5 | cf. 5 | cf. 6 |
| --- | --- | --- | --- |
| [polymer composition (by mass)] | | | |
| block copolymer: | | | |
| a-1 | 40 | 40 | 40 |
| a-2 | | | |
| olefin copolymer: | | | |
| b-1(density: 0.90 g/cm³) | 45 | | 45 |
| b-2(density: 0.89 g/cm³) | | | |
| b-5(density: 0.94 g/cm³) | | 45 | |
| softening agent (c-1) | 15 | 15 | 15 |
| organic peroxide (d-1) | 0.3 | 0.3 | — |
| crosslinking aid[1] | 0.2 | 0.2 | — |
| [structure and properties] | | | |
| size of the dispersed particles (μm) | 1.6 | 0.8 | 5.7 |
| Moldability(MFR)(g/10 min) | 4.8 | 0.4 | 5.2 |
| Scratch resistance(load)(MPa) | 0.049 | 0.049 | 0.025 |
| Abrasion resistance (amount of abrasion)(cm³) | 0.069 | 0.062 | 0.105 |
| Rubber elasticity (permanent set)(%) | 10 | 30 | 6 |
| Softness (hardness) | 70 | 94 | 71 |
| Tensile strength (MPa) | 24.5 | 28.9 | 24.1 |
| Tear strength (N/mm) | 52.1 | 58.8 | 57.6 |

[1] TAIC M-60 (product name) (NIPPON KASEI Co., Ltd.) (Triallyl Isocyanurate)

TABLE 4

|  | ex. 6 | cf. 7 | ex. 7 | ex. 8 |
| --- | --- | --- | --- | --- |
| [polymer composition (by mass)] | | | | |
| block copolymer: | | | | |
| a-1 | 40 | 40 | 35 | |
| a-2 | | | | 40 |
| olefin copolymer: | | | | |
| b-1(density: 0.90 g/cm³) | 35 | 35 | | 60 |
| b-2(density: 0.89 g/cm³) | | | 50 | |
| b-5(density: 0.94 g/cm³) | | | | |
| softening agent (c-1) | 25 | 25 | 15 | |
| organic peroxide (d-1) | 0.3 | — | 0.3 | 0.3 |
| crosslinking aid[1] | 0.2 | — | 0.2 | 0.2 |
| [structure and properties] | | | | |
| size of the dispersed particles (μm) | 4.3 | 4.1 | 1.2 | 1.5 |
| Moldability(MFR)(g/10 min) | 6.1 | 8.2 | 8.2 | 0.1 |
| Scratch resistance(load)(MPa) | 0.025 | 0.025 | 0.049 | 0.098 |
| Abrasion resistance (amount of abrasion)(cm³) | 0.080 | 0.172 | 0.059 | 0.003 |
| Rubber elasticity (permanent set)(%) | 6 | 5 | 11 | 15 |
| Softness (hardness) | 60 | 60 | 63 | 83 |
| Tensile strength (MPa) | 20.3 | 22.2 | 28.5 | 29.3 |
| Tear strength (N/mm) | 32.9 | 35.7 | 47.5 | 55.0 |

[1] TAIC M-60 (product name) (NIPPON KASEI Co., Ltd.) (Triallyl Isocyanurate)

TABLE 5

|  | ex. 9 | ex. 10 | ex. 11 | ex. 12 | ex. 13 |
|---|---|---|---|---|---|
| [polymer composition (by mass)] | | | | | |
| block copolymer: a-1 | 25 | 25 | 25 | 40 | 40 |
| olefin copolymer: b-1 (density: 0.90 g/cm³) | 65 | 65 | 65 | 45 | 35 |
| softening agent (c-1) | 10 | 10 | 10 | 15 | 25 |
| organic peroxide (d-1) | 0.3 | 0.3 | 0.3 | 0.3 | 0.3 |
| crosslinking aid[1] | 0.2 | 0.2 | 0.2 | 0.2 | 0.2 |
| lubricant (g-1) | 0.5 | 1 | 2 | 1 | 1 |
| [structure and properties] | | | | | |
| size of the dispersed particles (μm) | 0.3 | 0.5 | 0.5 | 1.8 | 3.9 |
| Moldability (MFR) (g/10 min) | 14 | 15 | 15 | 7.1 | 7.5 |
| Scratch resistance (load) (MPa) | >0.098[2] | >0.098[2] | >0.098[2] | 0.098 | 0.025 |
| Abrasion resistance (amount of abrasion) (cm³) | 0.025 | 0.013 | 0.005 | 0.029 | 0.038 |
| Rubber elasticity (permanent set) (%) | 15 | 14 | 13 | 9 | 6 |
| Softness (hardness) | 81 | 80 | 79 | 70 | 60 |
| Tensile strength (MPa) | 32.7 | 32.2 | 16.8 | 21.6 | 20.5 |
| Tear strength (N/mm) | 54.5 | 52.7 | 31.9 | 46.6 | 34.4 |

[1]TAIC M-60 (product name) (NIPPON KASEI Co., Ltd.) (Triallyl Isocyanurate)
[2]No scratch was observed when a load of 0.098 MPa was applied.

TABLE 6

|  | ex. 14 | ex. 15 | ex. 16 | ex. 17 | ex. 18 |
|---|---|---|---|---|---|
| [polymer composition (by mass)] | | | | | |
| block copolymer: a-1 | 25 | 25 | 25 | 40 | 40 |
| olefin copolymer: b-1 (density: 0.90 g/cm³) | 65 | 65 | 65 | 45 | 35 |
| softening agent (c-1) | 10 | 10 | 10 | 15 | 25 |
| organic peroxide (d-1) | 0.3 | 0.3 | 0.3 | 0.3 | 0.3 |
| crosslinking aid[1] | 0.2 | 0.2 | 0.2 | 0.2 | 0.2 |
| rubber reinforcing agent (e-1) | 10 | 20 | 30 | 20 | 20 |
| [structure and properties] | | | | | |
| Moldability (MFR) (g/10 min) | 4.5 | 3.2 | 0.02 | 0.8 | 1.3 |
| Scratch resistance (load) (MPa) | 0.098 | 0.098 | >0.098[2] | 0.049 | 0.025 |
| Abrasion resistance (amount of abrasion) (cm³) | 0.033 | 0.015 | 0.005 | 0.039 | 0.098 |
| Rubber elasticity (permanent set) (%) | 14 | 16 | 17 | 11 | 11 |
| Softness (hardness) | 83 | 87 | 91 | 74 | 65 |
| Tensile strength (MPa) | 32.0 | 30.4 | 34.3 | 28.8 | 20.9 |
| Tear strength (N/mm) | 55.6 | 60.8 | 63.1 | 59.1 | 44.9 |

[1]TAIC M-60 (product name) (NIPPON KASEI Co., Ltd.) (Triallyl Isocyanurate)
[2]No scratch was observed when a load of 0.098 MPa was applied.

The polymer compositions of Examples 1 to 18 are each obtained through dynamic crosslinking of a polymer composition, which contains the block copolymer (a-1 or a-2) along with the olefin copolymer (b-1, b-2 or b-4) having a density of 0.88 to 0.92 g/cm³ in respective amounts that satisfy the relational expression ①  and, if necessary, further contains the softening agent (c-1), the rubber reinforcing agent (e-1) and the lubricant (g-1) in amounts that satisfy the relational expressions ②, ④ and ⑤, respectively, with the help of the organic peroxide (d-1) added in an amount that satisfies the relational expression ③. As can be seen from the results of Tables 1 to 6 above, the polymer compositions of Examples 1 to 18 have improved moldability, scratch resistance and abrasion resistance, as do the molded articles formed of the respective compositions. It can also be seen that the polymer compositions of Examples 1 to 18 and the molded articles formed thereof also have rubber elasticity, softness and mechanical strength in a well-balanced manner.

In comparison, the polymer composition of Comparative Example 1, in which the ratio (by mass) of the amount of the olefin copolymer (b-1) to the amount of the block copolymer (a-1) is 0.50 and thus does not satisfy the relational expression ①, has a small MFR value (namely, 0) and therefore does not provide sufficient moldability, nor does it provide sufficient scratch resistance and abrasion resistance.

Similarly, neither of the polymer composition of Comparative Example 2, in which the amount of the softening agent (c-1) does not satisfy the relational expression ② (i.e., excessive), nor the polymer composition of Comparative Example 3, in which the density of the olefin copolymer (b-3) is 0.87 g/cm³ and does not meet the requirement of the present invention, fails to provide sufficient scratch resistance, abrasion resistance and mechanical strength.

The polymer composition of Comparative Example 4, which does not contain the organic peroxide and thus does not undergo dynamic crosslinking, fails to provide sufficient abrasion resistance and scratch resistance.

The polymer composition of Comparative Example 5, in which the density of the olefin copolymer (b-5) is 0.94 g/cm³ and thus does not meet the requirement of the present invention, exhibits an extremely large permanent set and fails to provide sufficient softness and rubber elasticity.

Not containing the organic peroxide and having not undergone the dynamic crosslinking, the polymer composition of Comparative Example 6 does not provide sufficient scratch resistance and abrasion resistance, nor does the polymer composition of Comparative Example 7.

Examples 19 to 21 and Comparative Examples 8 to 10

<1> Components of respective compositions were mixed according to the formulae shown in Tables 7 and 8 below. After thoroughly mixed in a mixer, the resulting mixtures were each fed to a twin screw extruder (TEM-35B manufactured by TOSHIBA MACHINE Co., Ltd.) and were kneaded for about 5 minutes at 230° C. Subsequently, each mixture was extruded to form strands, which were then cut to form pellets of the polymer composition. The polymer compositions of Examples 19 to 21 and Comparative Examples of 8 and 9, each of which contained the organic peroxide, were allowed to undergo dynamic crosslinking during kneading.

The moldability (MFR) was measured by the above-described method for each of the resulting polymer compositions. The results are shown in Tables 7 and 8 below:

<2> Using an injection molder (IS-55EPN, manufactured by TOSHIBA MACHINE Co., Ltd.) at a cylinder temperature of 230° C. and at a mold temperature of 50° C., the pellets of the polymer compositions obtained in <1> above were formed into molded articles of predetermined shape. A silicon-based mold release agent was used to help remove the articles from the molds. According to the above-described methods, the resulting molded articles were used to determine and rate the size of the dispersed particles, the abrasion resistance, the hydrolysis resistance, the grip, the shock absorbance, the oil resistance, the softness (hardness), the mechanical strength (tensile strength) and the softness. The results are as shown in Tables 7 and 8 below.

Example 22

<1> Components of the composition were mixed according to the formula shown in Table 7 except for the blowing agent (f-1). After thoroughly mixed in a mixer, the resulting mixture was fed to a twin screw extruder (TEM-35B manufactured by TOSHIBA MACHINE Co., Ltd.) and was kneaded for about 5 minutes at 230° C. Subsequently, the mixture was extruded to form strands, which were then cut to form pellets of the polymer composition, that is, the unfoamed form of the polymer composition. The polymer composition of Example 22 was made to undergo dynamic crosslinking during kneading.

<2> Using an injection molder (manufactured by KOBE STEEL Co., Ltd.) at a cylinder temperature of 200° C. and at a mold temperature of 50° C., the pellets of the polymer composition obtained in <1> above, along with the blowing agent (f-1), were formed into molded articles of predetermined shape. According to the above-described methods, the molded articles were used to determine and rate the abrasion resistance, the hydrolysis resistance and the expansion ratio. The results are as shown in Table 7.

Reference Example 1

A polyurethane elastomer (KURAMILON U1190, manufactured by KURARAY Co., Ltd.) alone was molded at a cylinder temperature of 200° C. and at a mold temperature of 50° C. into molded articles of predetermined shape. The moldability, the abrasion resistance, the hydrolysis resistance, the grip, the shock absorbance, the oil resistance, the softness (hardness), the mechanical strength (tensile strength) and the lightweightness of the molded article were measured and rated in the same manner as in <2> of Examples 19 to 21. The results are as shown in Table 8 below.

TABLE 7

|  | ex. 19 | ex. 20 | ex. 21 | ex. 22 |
|---|---|---|---|---|
| [polymer composition (by mass)] | | | | |
| block copolymer: a-2 olefin copolymer: | 25 | 40 | 35 | 25 |
| b-1(density: 0.90g/cm$^3$) | 65 | 45 | | 65 |
| b-2(density: 0.89 g/cm$^3$) | | | 50 | |
| softening agent (c-1) | 10 | 15 | 15 | 10 |
| organic peroxide (d-1) | 0.3 | 0.3 | 0.3 | 0.3 |
| crosslinking aid[1] | 0.2 | 0.2 | 0.2 | 0.2 |
| blowing agent (f-1) | — | — | — | 1 |
| [structure and properties] | | | | |
| Expansion ratio (%) | none | none | none | 1.52 |
| Size of the dispersed particles (μm) | 0.3 | 1.8 | 1.6 | —[2] |
| Moldability(MFR)(g/10 min) | 12 | 10 | 15 | —[2] |
| Abrasion resistance (amount of abrasion)(cm$^3$) | 0.025 | 0.047 | 0.055 | 0.037 |
| Hydrolysis resistance (%) | ≧97 | ≧97 | ≧97 | ≧97 |
| Grip | ○ | ○ | ○ | —[2] |
| Shock absorbance | ○ | ○ | ○ | —[2] |
| Oil resistance | ○ | ○ | ○ | —[2] |
| Softness (hardness) | 81 | 70 | 62 | —[2] |
| Tensile strength (MPa) | 31.9 | 22.7 | 24.2 | —[2] |
| Lightweightness (specific gravity) | ○ (0.90) | ○ (0.90) | ○ (0.90) | ○ (0.59) |

[1]TAIC M-60 (product name) (NIPPON KASEI Co., Ltd.) (Triallyl Isocyanurate)
[2]Not available

TABLE 8

|  | cf. 8 | cf. 9 | cf. 10 | Ref. 1 |
|---|---|---|---|---|
| [polymer composition (by mass)] | | | | Polyurethane Elastomer |
| block copolymer: a-2 olefin copolymer: | 60 | 30 | 25 | |
| b-1(density: 0.90 g/cm$^3$) | 30 | 40 | 65 | |
| b-2(density: 0.89 g/cm$^3$) | | | | |
| softening agent (c-1) | 10 | 30 | 10 | |
| organic peroxide (d-1) | 0.3 | 0.3 | — | |
| crosslinking aid[1] | 0.2 | 0.2 | — | |
| blowing agent (f-1) | — | — | — | |
| [structure and properties] | | | | |
| Expansion ratio (%) | none | none | none | none |
| Size of the dispersed particles (μm) | 35 | 27 | 1.1 | — |
| Moldability | 1.5 | 58 | 18 | Cannot |

TABLE 8-continued

|  | cf. 8 | cf. 9 | cf. 10 | Ref. 1 |
|---|---|---|---|---|
| ty(MFR)(g/10 min) |  |  |  | measured |
| Abrasion resistance (amount of abrasion)(cm³) | 0.133 | 0.150 | 0.077 | 0.017 |
| Hydrolysis resistance (%) | ≧97 | ≧97 | ≧97 | 20 |
| Grip | ○ | ○ | ○ | ○ |
| Shock absorbance | ○ | ○ | ○ | ○ |
| Oil resistance | X | X | ○ | ○ |
| Softness (hardness) | 71 | 60 | 83 | 90 |
| Tensile strength (MPa) | 15.0 | 10.6 | 33.3 | 51.0 |
| Lightweightness (specific gravity) | ○ (0.91) | ○ (0.90) | ○ (0.90) | X (1.20) |

[1]TAIC M-60 (product name) (NIPPON KASEI Co., Ltd.) (Triallyl Isocyanurate)

The polymer compositions of Examples 19 to 21 are each obtained through dynamic crosslinking of a polymer composition, which contains the block copolymer (a-2), along with the olefin copolymer (b-1 or b-2) having a density of 0.88 to 0.92 g/cm³, in respective amounts that satisfy the relational expression ① and further contains the softening agent (c-1) in an amount that satisfies the relational expressions ③, with the help of the organic peroxide (d-1) added in an amount that satisfies the relational expression ③. As can be seen from the results of Table 7, the polymer compositions of Examples 19 to 21 have improved moldability, abrasion resistance, hydrolysis resistance, grip, shock absorbance, oil resistance, mechanical strength, softness and lightweightness, as do the molded articles formed the respective compositions.

The polymer composition of Example 22 is obtained through dynamic crosslinking of a polymer composition, which contains the block copolymer (a-2), along with the olefin copolymer (b-1) having a density of 0.88 to 0.92 g/cm³, in respective amounts that satisfy the relational expression ① and further contains the softening agent (c-1) in an amount that satisfies the relational expressions ② and further contains the blowing agent, with the help of the organic peroxide (d-1) added in an amount that satisfies the relational expression ③. As can be seen from the results of Table 7, the foam made from the polymer composition of Example 22 has improved abrasion resistance and hydrolysis resistance.

In comparison, the polymer composition of Comparative Example 8, in which the ratio (by mass) of the amount of the olefin copolymer (b-1) to the amount of the block copolymer (a-2) is 0.50 and thus does not satisfy the relational expression ①, does not provide sufficient moldability, nor does it provide sufficient abrasion resistance and oil resistance.

Similarly, the polymer composition of Comparative Example 9, in which the amount of the softening agent (c-1) does not satisfy the relational expression ② (i.e., excessive), fails to provide sufficient abrasion resistance and oil resistance.

The polymer composition of Comparative Example 10, which does not contain the organic peroxide and thus does not undergo dynamic crosslinking, fails to provide sufficient abrasion resistance.

INDUSTRIAL APPLICABILITY

As set forth, the polymer composition of the present invention has various improved properties, including moldability, abrasion resistance, scratch resistance, hydrolysis resistance, softness, rubber elasticity, grip, shock absorbance, oil resistance, lightweightness and mechanical strength, and has these properties in a well-balanced manner. Thus, having many improved properties, the polymer composition of the present invention can be effectively used in various applications.

Among other properties, the improved abrasion resistance, scratch resistance, hydrolysis resistance, grip, shock absorbance and oil resistance make the composition of the present invention particularly a suitable material for soles of shoes, sandals, Japanese sandals, scuffs and other footgears, in particular for a material for shoe soles. Because of the various improved properties, the footgear soles made from the polymer composition of the present invention are less susceptible to wear, scratches, and weathering by exposure to rain or oil and is considerably less slippery. Moreover, the improved shock absorbance and cushion significantly reduce damage to feet (legs) and waists.

What is claimed is:

1. A polymer composition prepared by subjecting a crosslinkable polymer composition to dynamic crosslinking, the crosslinkable polymer composition consisting essentially of:
   (a) a block copolymer comprising two or more polymer blocks A of a vinyl aromatic compound and one or more polymer blocks B of a conjugated diene, the polymer block B being either hydrogenated or unhydrogenated;
   (b) an olefin copolymer having a density of 0.88 to 0.92 g/cm³ and obtained through copolymerization of ethylene and an α-olefin having 4 to 12 carbon atoms;
   (c) a softening agent; and
   (d) an organic peroxide, the respective amounts of components satisfying the following expressions ① to ③:

$$0.66 \leq Wb/Wa \leq 4 \quad \text{①}$$

$$0 \leq Wc/(Wa+Wb+Wc) \leq 0.25 \quad \text{②}$$

$$0.001 \leq Wd/(Wa+Wb+Wc) \leq 0.01 \quad \text{③}$$

wherein Wa, Wb, Wc and Wd represent the respective amounts by weight of the block copolymer (a), the olefin copolymer (b), the softening agent (c) and the organic peroxide (d) that are present in the polymer composition prior to dynamic crosslinking.

2. The polymer composition according to claim 1, wherein the composition has a domain-matrix structure in which particles of block copolymer (a) are dispersed in a matrix phase of olefin copolymer (b).

3. The polymer composition according to claim 1, wherein said vinyl aromatic compound of polymer block A is styrene, α-methylstyrene, o-methylstyrene, α-methylstyrene, p-methylstyrene, p-t-butylstyrene, 2,4-dimethylstyrene, 2,4,6-trimethylstyrene, vinylnaphthalene or vinylanthracene and optionally no more than 10% by weight of a monomer selected from the group consisting of 1-butene, pentene, hexene, butadiene, isoprene, methyl vinyl ether, methyl methacrylate and vinyl acetate.

4. The polymer composition according to claim 1, wherein, when polymer block B is formed from butadiene, 1,2-addition of the butadiene units ranges from 20 to 70 mol % and 1,4-addition of the butadiene units ranges from 30 to 10 mol % and when polymer block B is formed from isoprene alone or with butadiene, the mode of addition in polymerization is such that 1,2-addition plus 3,4-addition ranges from 5 to 70 mole %.

5. The polymer composition according to claim 1, wherein said α-olefin is 1-butene, 2-methyl-1-butene, 3-methyl-1-butene, 1-pentene, 4-methyl-1-pentene, 1-hexene, 1-octene, 1-decene and 1-dodecene.

6. A polymer composition prepared by subjecting a crosslinkable polymer composition to dynamic crosslinking, the crosslinkable polymer composition consisting essentially of:
   (a) a block copolymer comprising two or more polymer blocks A of a vinyl aromatic compound and one or more polymer blocks B of a conjugated diene, the polymer block B being either hydrogenated or unhydrogenated;
   (b) an olefin copolymer having a density of 0.88 to 0.92 g/cm$^3$ and obtained through copolymerization of ethylene and an α-olefin having 4 to 12 carbon atoms;
   (c) a softening agent;
   (d) an organic peroxide; and
   (e) a rubber reinforcing agent, the respective amounts of components satisfying the following expressions ① to ④:

$$0.66 \leq Wb/Wa \leq 4 \qquad ①$$

$$0 \leq Wc/(Wa+Wb+Wc) \leq 0.25 \qquad ②$$

$$0.001 \leq Wd/(Wa+Wb+Wc) \leq 0.01 \qquad ③$$

$$We/(Wa+Wb+Wc) \leq 0.3 \qquad ④$$

wherein Wa, Wb, Wc, Wd and We represent the respective amounts by weight of the block copolymer (a), the olefin copolymer (b), the softening agent (c), the organic peroxide (d) and the reinforcing agent (e) that are present in the polymer composition prior to dynamic crosslinking.

7. The polymer composition according to claim 6, wherein the rubber reinforcing agent (e) is a carbon black, a carbon fiber or a fibrous organic material.

8. A polymer composition prepared by subjecting a crosslinkable polymer composition to dynamic crosslinking, the crosslinkable polymer composition consisting essentially of:
   (a) a block copolymer comprising two or more polymer blocks A of a vinyl aromatic compound and one or more polymer blocks B of a conjugated diene, the polymer block B being either hydrogenated or unhydrogenated;
   (b) an olefin copolymer having a density of 0.88 to 0.92 g/cm$^3$ and obtained through copolymerization of ethylene and an α-olefin having 4 to 12 carbon atoms;
   (c) a softening agent; and
   (d) an organic peroxide,
   (f) a blowing agent, the respective amounts of components satisfying the following expressions ① to ③:

$$0.66 \leq Wb/Wa \leq 4 \qquad ①$$

$$0 \leq Wc/(Wa+Wb+Wc) \leq 0.25 \qquad ②$$

$$0.001 \leq Wd/(Wa+Wb+Wc) \leq 0.01 \qquad ③$$

wherein Wa, Wb, Wc and Wd represent the respective amounts by weight of the block copolymer (a), the olefin copolymer (b), the softening agent (c) and the organic peroxide (d) that are present in the polymer composition prior to dynamic crosslinking.

9. The polymer composition according to claim 8, wherein the blowing agent (f) a carbonate salt, an organic acid, an azo compound, a nitroso compound or a sulfonyl hydrazide.

10. The polymer composition according to claim 8, wherein the blowing agent (f) is incorporated in the composition in an amount that satisfies the expression:

$$0.001 \leq Wf/(Wa+Wb+Wc) \leq 0.1.$$

11. A polymer composition prepared by subjecting a crosslinkable polymer composition to dynamic crosslinking, the crosslinkable polymer composition consisting essentially of:
   (a) a block copolymer comprising two or more polymer blocks A of a vinyl aromatic compound and one or more polymer blocks B of a conjugated diene, the polymer block B being either hydrogenated or unhydrogenated;
   (b) an olefin copolymer having a density of 0.88 to 0.92 g/cm$^3$ and obtained through copolymerization of ethylene and an α-olefin having 4 to 12 carbon atoms;
   (c) a softening agent;
   (d) an organic peroxide;
   (e) a rubber reinforcing agent; and
   (f) a blowing agent, the respective amounts of components satisfying the following expressions ① to ④:

$$0.66 \leq Wb/Wa \leq 4 \qquad ①$$

$$0 \leq Wc/(Wa+Wb+Wc) \leq 0.25 \qquad ②$$

$$0.001 \leq Wd/(Wa+Wb+Wc) \leq 0.01 \qquad ③$$

$$We/(Wa+Wb+Wc) \leq 0.3 \qquad ④$$

wherein Wa, Wb, Wc, Wd and We represent the respective amounts by weight of the block copolymer (a), the olefin copolymer (b), the softening agent (c), the organic peroxide (d) and the reinforcing agent (e) that are present in the polymer composition prior to dynamic crosslinking.

12. A polymer composition prepared by subjecting a crosslinkable polymer composition to dynamic crosslinking, the crosslinkable polymer composition consisting essentially of:
   (a) a block copolymer comprising two or more polymer blocks A of a vinyl aromatic compound and one or more polymer blocks B of a conjugated diene, the polymer block B being either hydrogenated or unhydrogenated;
   (b) an olefin copolymer having a density of 0.88 to 0.92 g/cm$^3$ and obtained through copolymerization of ethylene and an α-olefin having 4 to 12 carbon atoms;
   (c) a softening agent;
   (d) an organic peroxide; and
   (g) a lubricant, the respective amounts of components satisfying the following expressions ① to ③ and ⑤:

$$0.66 \leq Wb/Wa \leq 4 \qquad ①$$

$$0 \leq Wc/(Wa+Wb+Wc) \leq 0.25 \qquad ②$$

$$0.001 \leq Wd/(Wa+Wb+Wc) \leq 0.01 \qquad ③$$

$$Wg/(Wa+Wb+Wc) \leq 0.3 \qquad ⑤$$

wherein Wa, Wb, Wc, Wd and Wg represent the respective amounts by weight of the block copolymer (a), the olefin copolymer (b), the softening agent (c) and the lubricant (g) that are present in the polymer composition prior to dynamic crosslinking.

13. A polymer composition prepared by subjecting a crosslinkable polymer composition to dynamic crosslinking, the crosslinkable polymer composition consisting essentially of:
(a) a block copolymer comprising two or more polymer blocks A of a vinyl aromatic compound and one or more polymer blocks B of a conjugated diene, the polymer block B being either hydrogenated or unhydrogenated;
(b) an olefin copolymer having a density of 0.88 to 0.92 g/cm$^3$ and obtained through copolymerization of ethylene and an α-olefin having 4 to 12 carbon atoms;
(c) a softening agent;
(d) an organic peroxide;
(e) a rubber reinforcing agent; and
(g) a lubricant, the respective amounts of components satisfying the following expressions ① to ⑤:

$$0.66 \leq Wb/Wa \leq 4 \quad \quad ①$$

$$0 \leq Wc/(Wa+Wb+Wc) \leq 0.25 \quad \quad ②$$

$$0.001 \leq Wd/(Wa+Wb+Wc) \leq 0.01 \quad \quad ③$$

$$We/(Wa+Wb+Wc) \leq 0.3 \quad \quad ④$$

$$Wg/(Wa+Wb+Wc) \leq 0.3 \quad \quad ⑤$$

wherein Wa, Wb, Wc, Wd, We and Wg represent the respective amounts by weight of the block copolymer (a), the olefin copolymer (b), the softening agent (c), the organic peroxide (d) and the reinforcing agent (e) that are present in the polymer composition prior to dynamic crosslinking.

14. A footgear sole comprising:
the polymer composition according to claim 1.

15. A footgear sole comprising:
the polymer composition according to claim 6.

16. A footgear sole comprising:
the polymer composition according to claim 8.

17. A footgear sole comprising:
the polymer composition according to claim 11.

18. A footgear sole comprising:
the polymer composition according to claim 12.

* * * * *